US007685040B2

(12) United States Patent
Hodes et al.

(10) Patent No.: US 7,685,040 B2
(45) Date of Patent: Mar. 23, 2010

(54) INVESTMENT METHODS AND SYSTEMS FOR USE IN ASSOCIATION WITH A PAIRS TRADING STRATEGY

(75) Inventors: Joel C. Hodes, New York, NY (US); John A. Roberts, Congers, NY (US)

(73) Assignee: Morgan Stanley, New York, NY (US)

( * ) Notice: Subject to any disclaimer, the term of this patent is extended or adjusted under 35 U.S.C. 154(b) by 1136 days.

(21) Appl. No.: 10/865,046

(22) Filed: Jun. 10, 2004

(65) Prior Publication Data

US 2004/0254869 A1    Dec. 16, 2004

Related U.S. Application Data

(60) Provisional application No. 60/478,104, filed on Jun. 11, 2003.

(51) Int. Cl.
*G06Q 40/00*    (2006.01)
(52) U.S. Cl. .................... 705/35; 705/37; 705/36 R
(58) Field of Classification Search .................. 705/35, 705/36 R, 39
See application file for complete search history.

(56) References Cited

U.S. PATENT DOCUMENTS

| | | | | |
|---|---|---|---|---|
| 6,078,905 A | * | 6/2000 | Pich-LeWinter | 705/36 R |
| 6,115,697 A | * | 9/2000 | Gottstein | 705/36 R |
| 6,578,016 B1 | * | 6/2003 | Trankina et al. | 705/39 |
| 7,099,838 B1 | * | 8/2006 | Gastineau et al. | 705/35 |
| 7,103,569 B1 | * | 9/2006 | Groveman et al. | 705/35 |
| 2002/0082852 A1 | * | 6/2002 | Greene et al. | 705/1 |
| 2003/0225648 A1 | * | 12/2003 | Hylton | 705/35 |
| 2004/0039673 A1 | * | 2/2004 | Amberson et al. | 705/36 |
| 2004/0107157 A1 | * | 6/2004 | Bleunven et al. | 705/37 |
| 2005/0119919 A1 | * | 6/2005 | Eder | 705/4 |

OTHER PUBLICATIONS

Mark E Holder, Christopher K Ma, & James E Mallett. (2002). Futures price limit moves as options. The Journal of Futures Markets, 22(9), 901-913. Retrieved Nov. 2, 2009.*

* cited by examiner

*Primary Examiner*—Narayanswamy Subramanian
*Assistant Examiner*—Kito R Robinson
(74) *Attorney, Agent, or Firm*—K&L Gates LLP

(57) ABSTRACT

Investment methods for use by institutional investors are provided. The method may include the steps of selling a call associated with a first group of securities of the investor to a first broker/dealer; entering into a short swap arrangement with an equity swap entity, the short swap arrangement being associated with the call and the first group of securities; entering into a capped swap arrangement with a second broker/dealer based on a second group of securities; and, entering into a long swap arrangement with the equity swap entity based on the second group of securities. Methods for arranging an investment strategy for an institutional investor are also provided.

15 Claims, 9 Drawing Sheets

FIG. 9

Ranges for Returns

| | Expected Mean | 1 Std. Dev. | 2 Std. Dev. |
|---|---|---|---|
| Pre-Tax Cash Return (US$) | 2.75 mm. gain | 7.00 mm gain to 1.50 mm loss | 11.00 mm gain to 5.75 mm loss |
| Pre-Tax Equivalent Return (US$) | 14.42 mm gain | 18.6 mm gain to 10.17 mm gain | 22.92 mm gain to 5.92 mm gain |
| Pre-Tax Equivalent Return (%) | 2.88 | 3.73 to 2.03 | 4.58 to 1.18 |
| Pre-Tax Equivalent Spread to FFR (bp) | +163 | +248 to +78 | +333 to -7 |

INVESTMENT METHODS AND SYSTEMS FOR USE IN ASSOCIATION WITH A PAIRS TRADING STRATEGY

CROSS-REFERENCE TO RELATED APPLICATION

The present application claims priority to U.S. Provisional Patent Application Ser. No. 60/478,104, filed on Jun. 11, 2003.

BACKGROUND

Many institutional investors pursue investment strategies that employ conventional instruments such as derivatives, equity swaps, or other volatility-based investments to obtain enhanced financial returns. However, such investment strategies often do not balance the goal of achieving enhanced returns through use of volatility-based vehicles with the objectives of (1) maintaining a relatively high level of liquidity for the investments, and (2) minimizing credit risks associated with the investments.

What are needed, therefore, are improved investment strategies that are capable of addressing the deficiencies of conventional investment strategies utilizing volatility-based investments.

SUMMARY

The present invention provides embodiments of an investment method for use by institutional investors. Various embodiments of the method include selling a call associated with a first group of securities of the investor to a first broker/dealer; entering into a short swap arrangement with an equity swap entity, the short swap arrangement being associated with the call and the first group of securities; entering into a capped swap arrangement with a second broker/dealer based on a second group of securities; and, entering into a long swap arrangement with the equity swap entity based on the second group of securities.

In various embodiments, the investment method of the present invention may also include one or more of the following steps: basing the short swap arrangement on a net delta between the call and the first group of securities; basing the long swap arrangement on a delta of the capped swap arrangement based on the second group of securities; setting a cap value of the capped swap arrangement so that a delta of an embedded long call on the second group of securities substantially equals a delta of the call on the first group of securities; negotiating a termination of at least one of the call, the capped swap arrangement, the long swap arrangement, and the short swap arrangement; and/or selling the first group of securities.

Embodiments of the investment method of the present invention may also include at least one of the investor and the equity swap entity rebalancing respective notional values of the long swap arrangement on the second group of securities and the short swap arrangement on the first group of securities. Furthermore, at least one of the broker/dealers may be based outside of the United States or inside the United States.

The present invention also includes embodiments of a method for arranging an investment strategy for an institutional investor in accordance with the previously described investment method embodiments. In addition, the present invention includes system and computer-readable media embodiments associated with the investment method embodiments described herein.

Other embodiments of the present invention will become apparent to those skilled in the art upon review of the following description and figures. It is intended that all such additional embodiments be within the scope of the present invention and be protected by the claims.

DESCRIPTION

Figure 1:
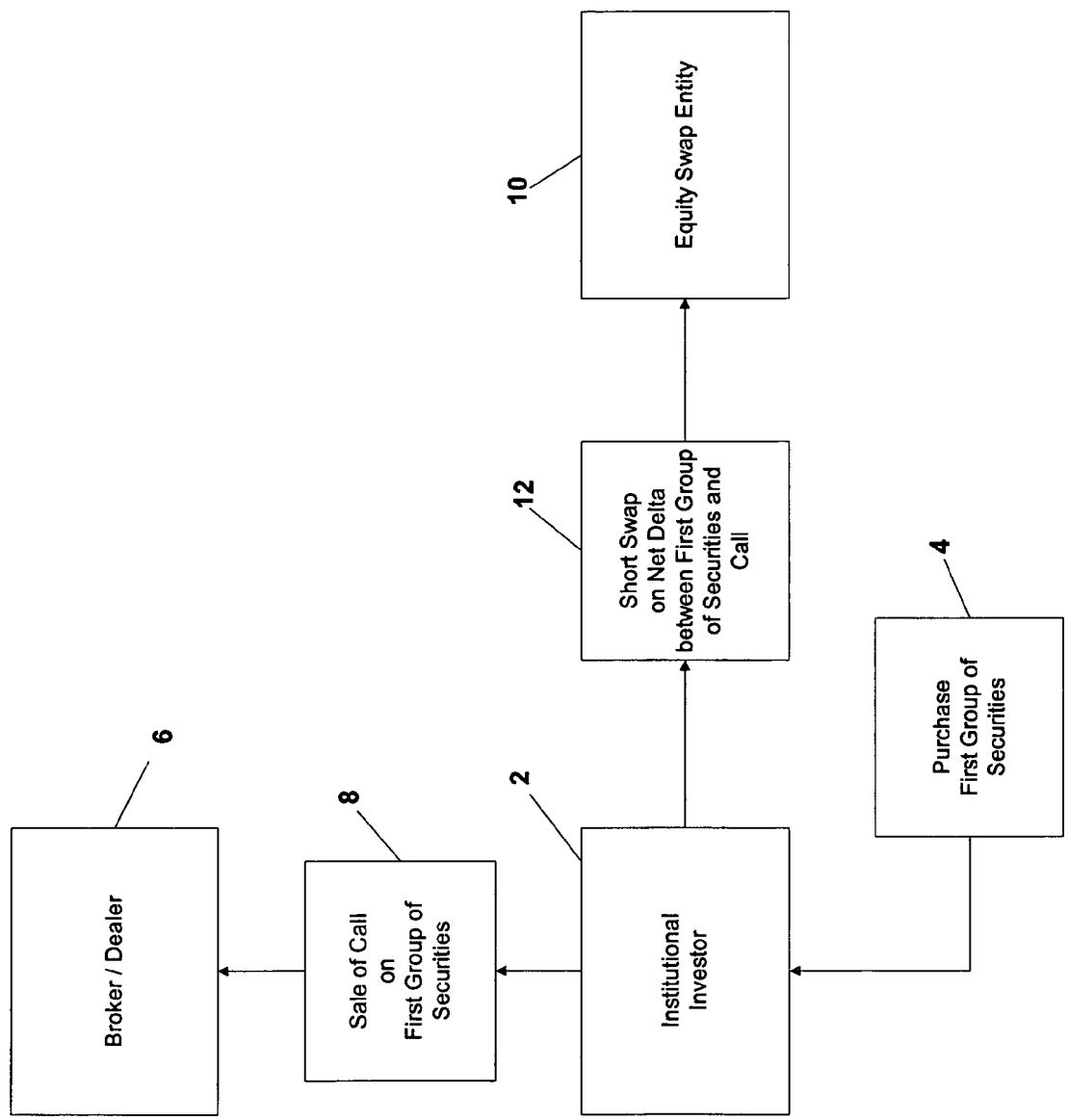
FIG. 1 includes a schematic diagram illustrating various aspects of the present methods and systems.

Referring now to FIG. 1, in one illustrative embodiment of the present methods and systems, aspects of an investment strategy of an institutional investor 2 are provided. As shown, the institutional investor 2 purchases a certain volume of a first group of securities 4 at a certain unit price. In one aspect, the institutional investor 2 can be a United States corporation, for example, with cash to invest or any other institution suitable for use in association with the present methods and systems that desires to pursue an investment strategy. The institutional investor 2 interacts with a Broker/Dealer 6 to sell a call 8 related to the first group of securities 4. In one aspect of the present methods and systems, the Broker/Dealer 6 can be a Broker/Dealer located in the United States. Those skilled in the art can appreciate that a call, as applied in various embodiments herein, is an option contract giving the owner of the call the right (but not necessarily the obligation) to buy a specified amount of an underlying security (such as one or more shares, for example, of a security) at a specified price within or at a specified time. Under certain circumstances, call options can also be cash-settled. In addition, in application of the various embodiments disclosed herein, it can be appreciated that it may be required under applicable laws, regulations, or other policies to have the Broker/Dealer 6 act as an agent for the purchase of a call sold by a United States entity (e.g., a United States corporation).

The institutional investor 2 may then communicate with an equity swap entity 10 to arrange a short swap 12 associated with the net delta of the first group of securities 4 and the call 8. In one aspect, the delta of the short call option can be calculated using a standard Black-Scholes option model, for example. As applied to various embodiments discussed herein, the delta represents the number of shares per 100 notional shares in the option contract that, when held as a long position with the short call, will neutralize relatively small price movements in the share price. The "delta" of the group of shares will be the number of shares (i.e., a 100 shares has a delta of 100). The net delta is the difference between the two deltas. For example, 100 notional shares of a call with a delta of −70 (short) compared to 100 shares of a long position results in a net delta of 30. The equity swap entity 10 can be any financial entity suitable for performing one or more kinds of swaps such as, for example and without limitation, equity swaps, fixed income swaps, and other kinds of swaps. In the context of the various potential embodiments of the present methods and systems, the equity swap entity 10 may or may not also perform the functions of a Broker/Dealer, as that term is understood by those skilled in the art. A long equity swap holder receives the economic benefit (if any) of the appreciation and dividends of an underlying equity and is responsible for any depreciation and a finance charge. A short equity swap holder receives any depreciation in the underlying equity plus a finance charge and is responsible for payment of any appreciation in the underlying equity plus any dividends paid. It should be noted that while only one pair of swaps is described herein merely for convenience of disclosure and illustration, it can be appreciated that multiple such swaps are possible within the scope of the present methods and systems.

Figure 2:
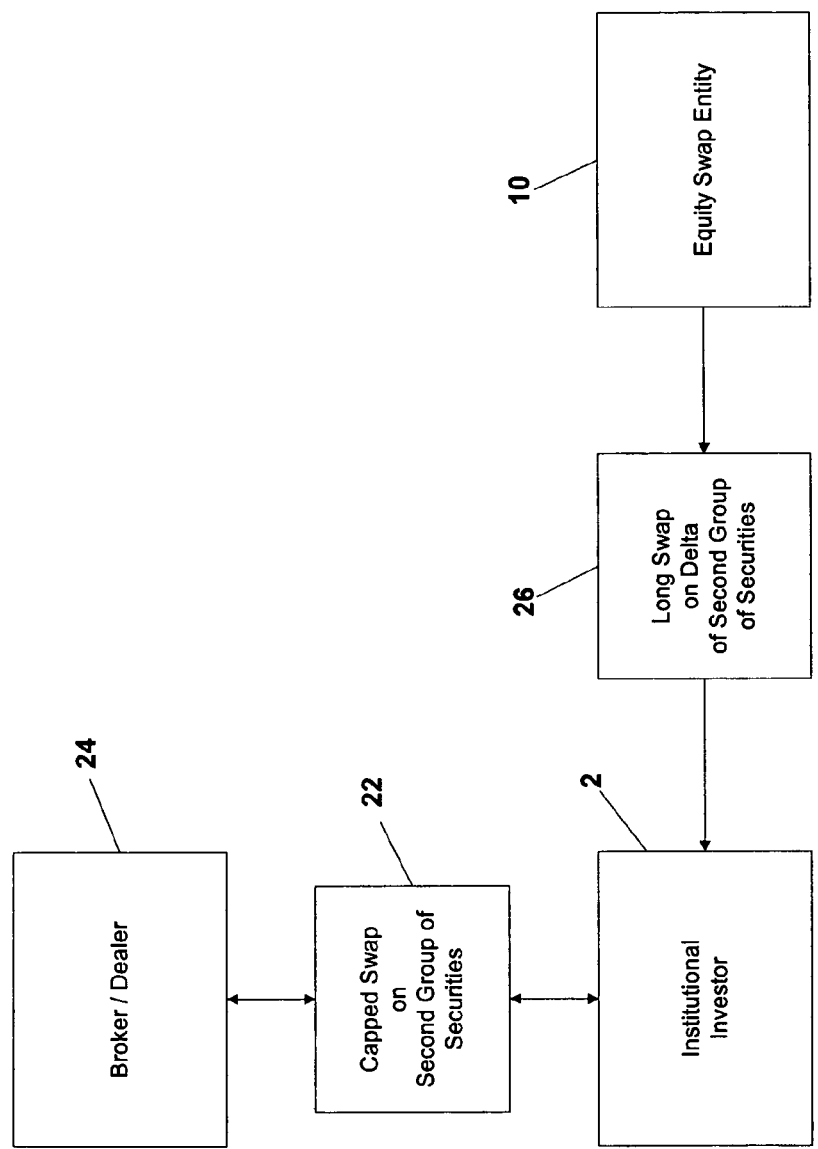
FIG. 2 includes a schematic diagram illustrating various aspects of the present methods and systems.

Referring now to FIG. 2, the institutional investor 2 enters into a capped swap agreement on a second group of securities 22 with a Broker/Dealer 24. In various aspects discussed herein, the Broker/Dealer 24 can be an international Broker/Dealer, for example, and/or a Broker/Dealer based outside of the United States. In one aspect, the initial notional value of the second group of securities 22 is equal to, or substantially equal to, the value of the first group of securities 4 purchased by the institutional investor 2. In association with the capped swap agreement on the second group of securities 22, the institutional investor 2 makes an upfront payment of a portion of the notional value of the second group of securities 22. The institutional investor 2 also agrees to pay appreciation on the second group of securities 22 up to a predetermined cap value, which may be expressed as a price per share cap value, for example. The Broker/Dealer 24 agrees to pay depreciation on the shares plus a payment based on a preselected rate of interest. In one aspect, the rate of interest may be Libor-based, for example, which can be defined as the rate of interest at which banks borrow funds, in marketable size, from other banks in the London interbank market. In various other aspects, the rate of interest can also be any other suitable benchmark or reference rate. In another aspect, the cap value can be set so that the delta of the embedded long call on the second group of securities equals or substantially equals the delta of the call written on the first group of securities. The institutional investor 2 then may enter into a long swap arrangement 26 with the equity swap entity 10 based on the delta of the capped swap arrangement on the second group of securities 22. The delta on the capped swap includes the delta of a long call (as described above) less the notional number of shares, which results in a negative number. For example, a long call having a notional 100 shares has a delta of 70, compared to the notional shares in the swap having a delta of −100, which comparison results in a net delta of −30.

In one example, it can be seen that application of various aspects of the present methods and systems to an investment strategy may yield competitive returns on cash investments (after all expenses) for an investor by (1) anticipating an increase in actual volatility of returns of the first group of securities compared to the actual volatility of returns of the second group of securities, or (2) anticipating an increase in expected volatility of returns of the first group of securities compared to expected volatility of returns of the second group of securities. It can further be appreciated, however, that many other investor objectives and/or investment strategies may be facilitated in connection with application of the present investment methods and systems.

Figure 3:
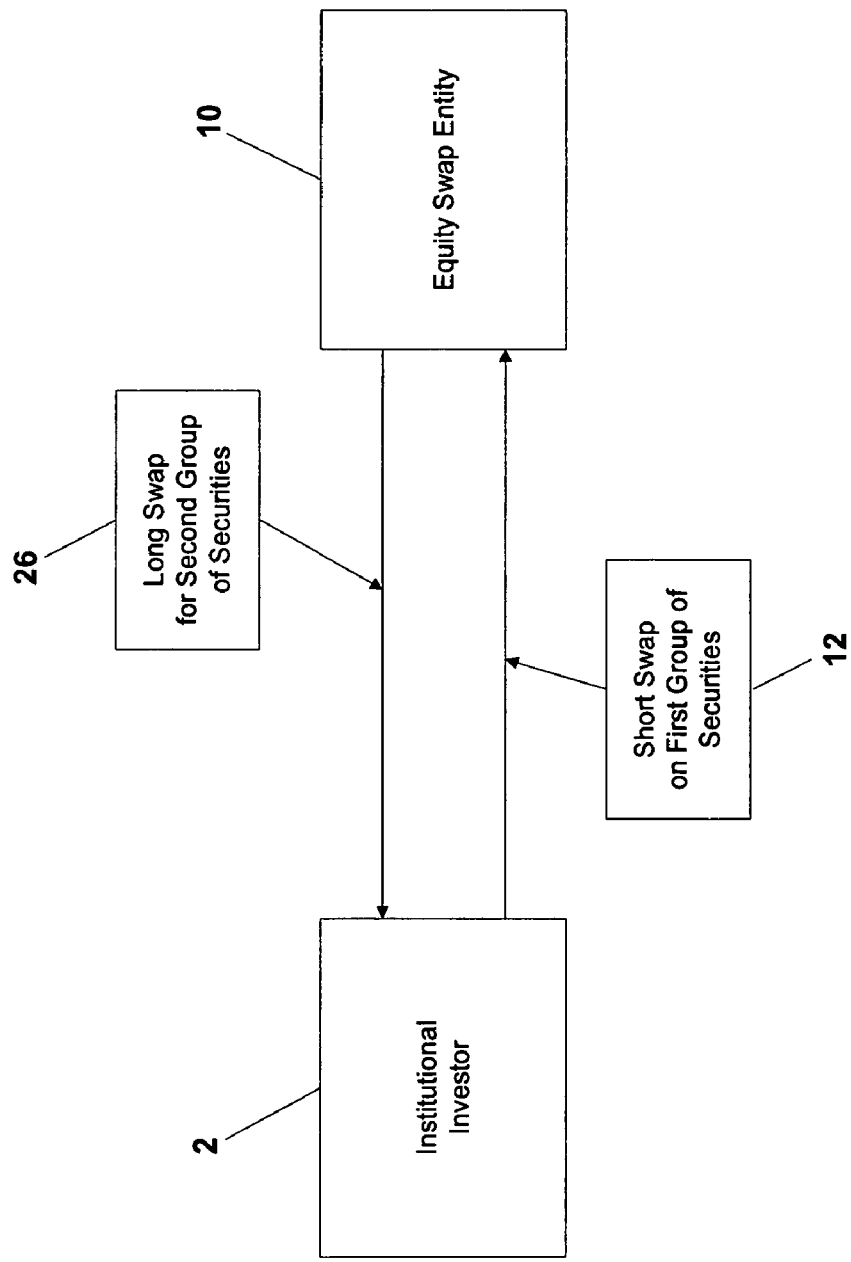
FIG. 3 includes a schematic diagram illustrating various aspects of the present methods and systems.

Referring now to FIG. 3, the institutional investor 2 and the equity swap entity 10 can, on a periodic basis or other predetermined frequency (e.g., daily), adjust or rebalance the respective notional values of the long swap arrangement on the second group of securities 26 and of the short swap arrangement on the first group of securities 12. The respective notional values can be rebalanced to match, or substantially match, the current net delta of the related equity positions. In one aspect, the deltas of the related equity positions can be calculated at the closing price each day on the basis of prevailing market levels. Calculation of these deltas can be performed in accordance with above discussion regarding delta calculations.

Figure 4:
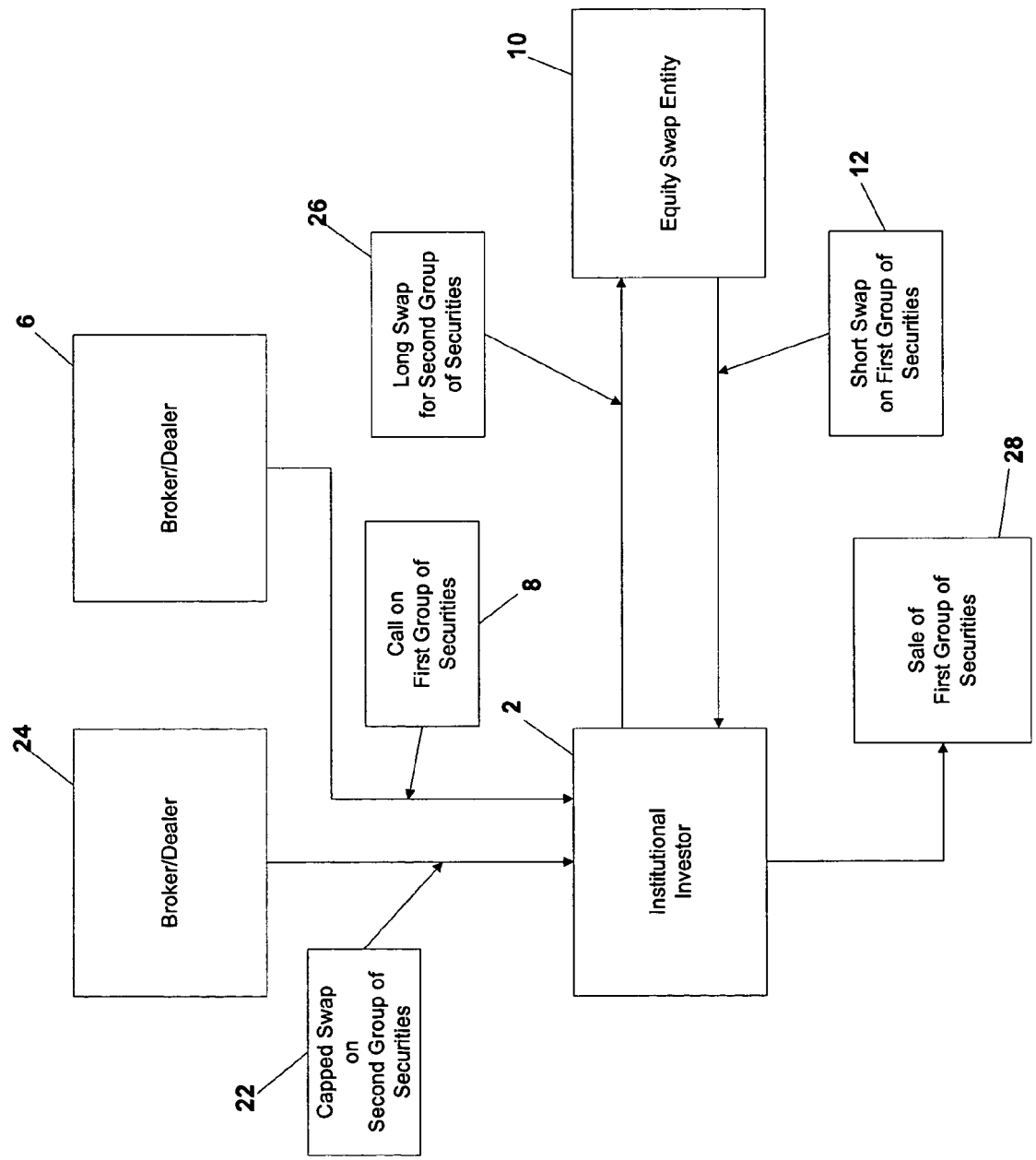
FIG. 4 includes a schematic diagram illustrating various aspects of the present methods and systems.

Referring now to FIG. 4, at the end of a predetermined time period, the institutional investor 2 can affect a sale of the first group of securities 28. The institutional investor 2 can also negotiate to terminate its call option on the first group of securities 8, the capped swap arrangement on the second group of securities 22, the long swap arrangement on the second group of securities 26, and/or the short swap arrangement for the first group of securities 12.

It can be appreciated that various aspects or functions of the present methods and systems may be performed or facilitated by an investment bank or equivalent entity. The investment bank may work in connection with, or serve in the capacity of, one or more of the institutional investor 2, the Broker/Dealers 6, 24, and/or the equity swap entity 10. For example, the investment bank may arrange for the sale of securities, enter into or arrange an equity swap arrangement, and/or perform other activities or structure transactions in accordance with the present invention.

OPERATIONAL EXAMPLES

Figure 5:
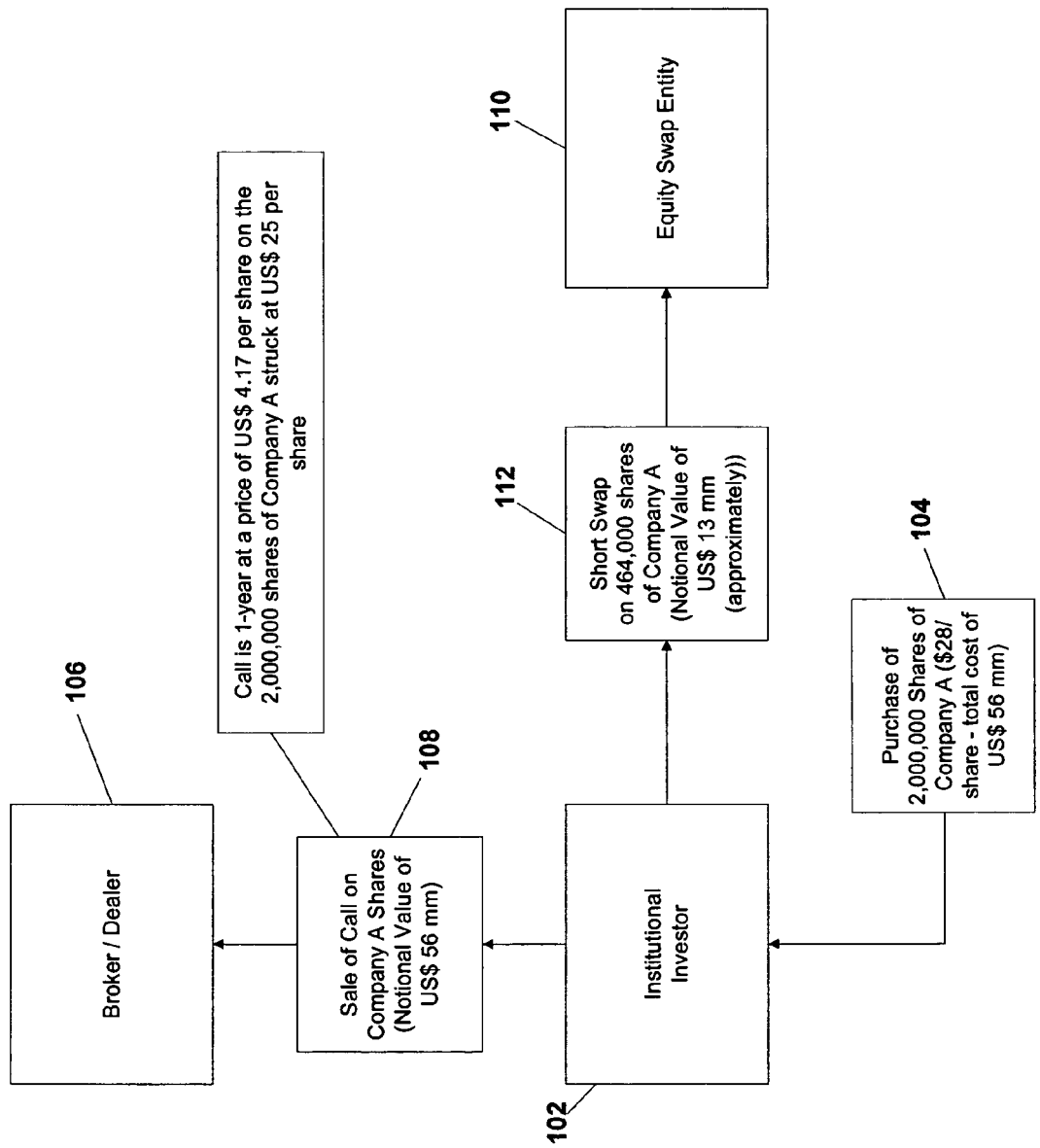
FIG. 5 includes a schematic diagram illustrating various operational examples of the present methods and systems.
Figure 6:
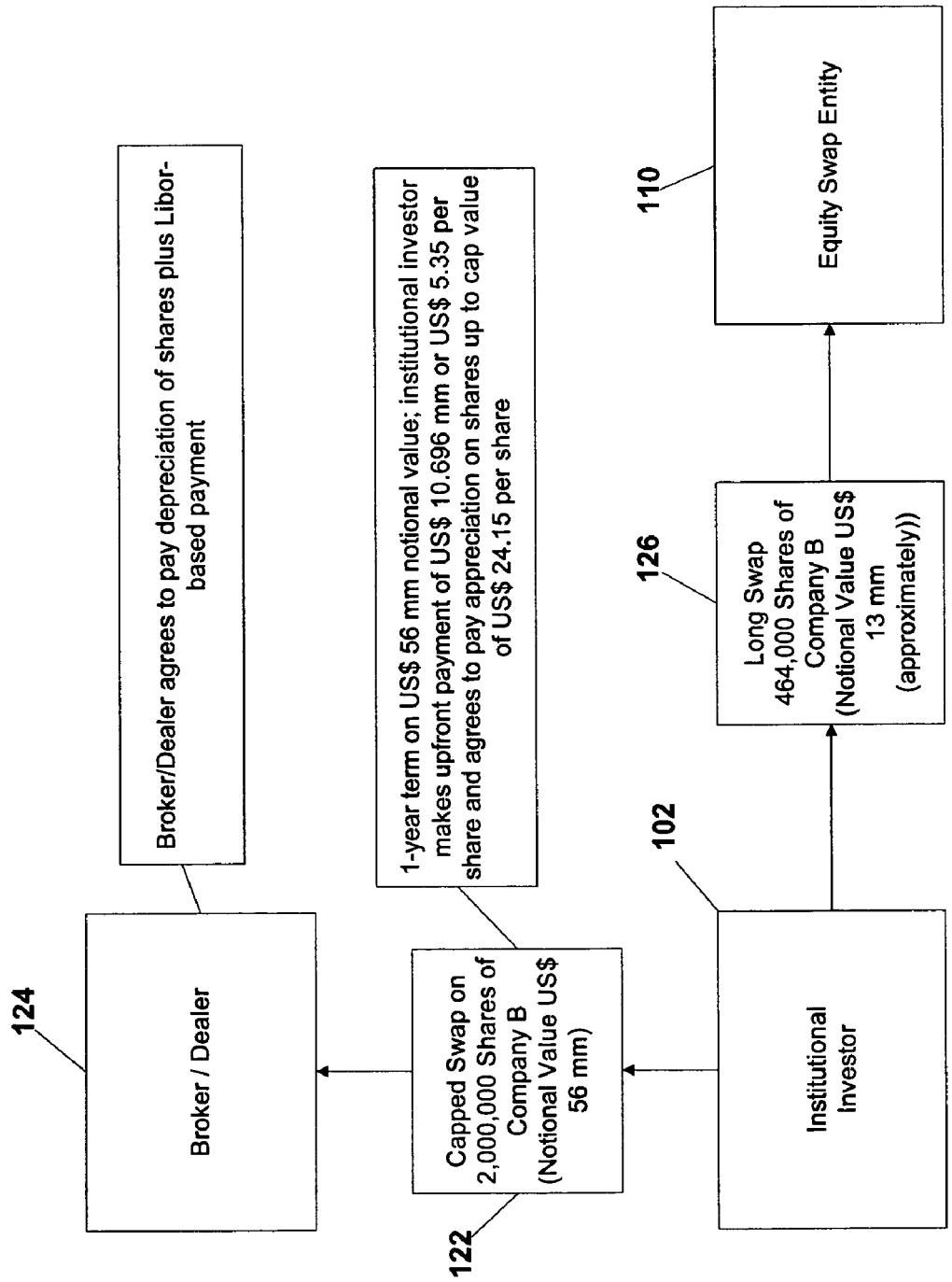
FIG. 6 includes a schematic diagram illustrating various operational aspects of the present methods and systems.
Figure 7:
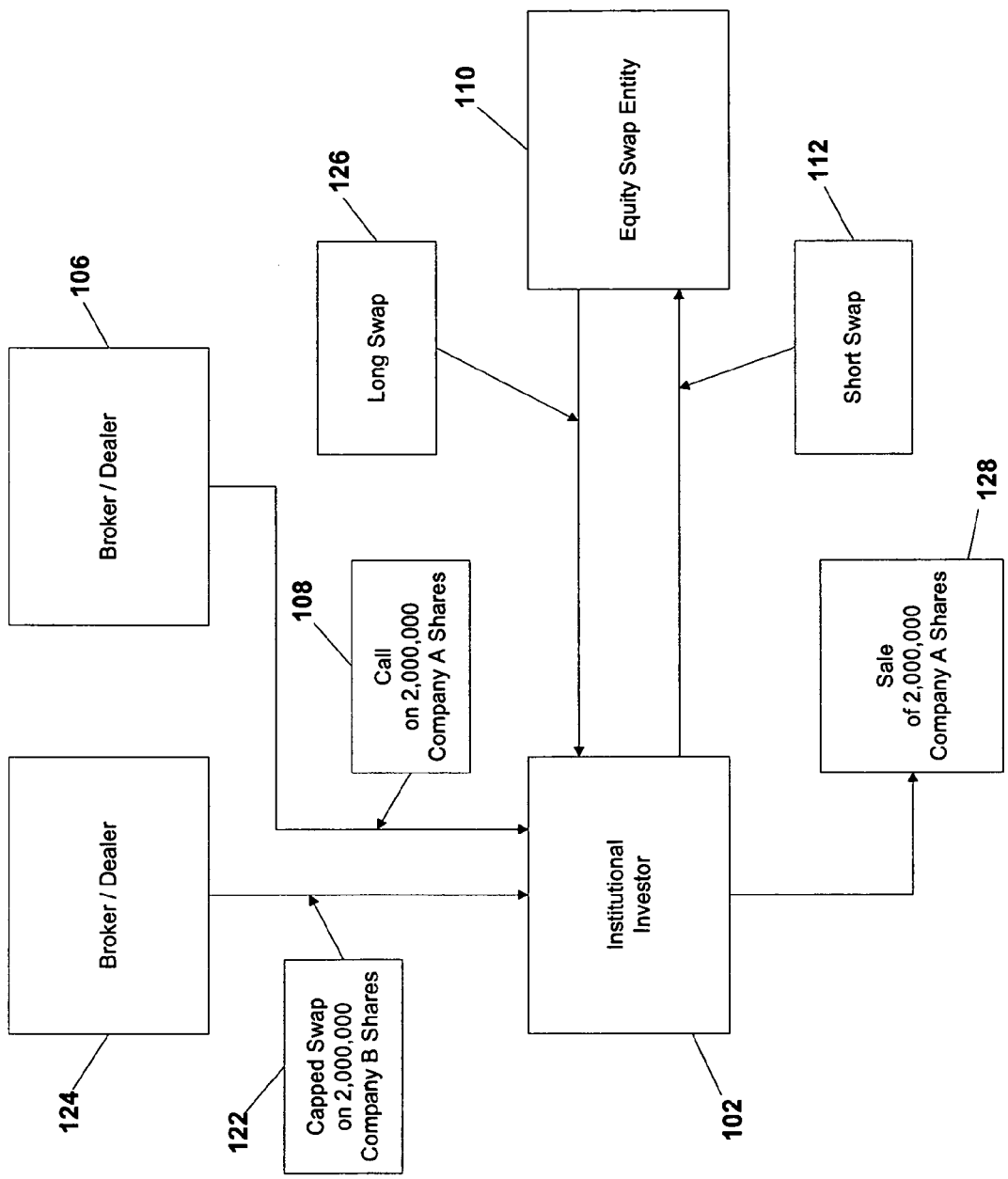
FIG. 7 includes a schematic diagram illustrating various operational aspects of the present methods and systems.

Referring now to FIGS. 5 through 7, various operational examples are provided to illustrate various aspects of the embodiments of the present methods and systems for those skilled in the art. No particular aspect or aspects of these operational examples are intended to limit the scope of the present methods and systems. FIGS. 5 through 7, in accordance with the previous discussion of FIGS. 1 through 4, present examples of the practice of the present methods and systems.

Figure 8:
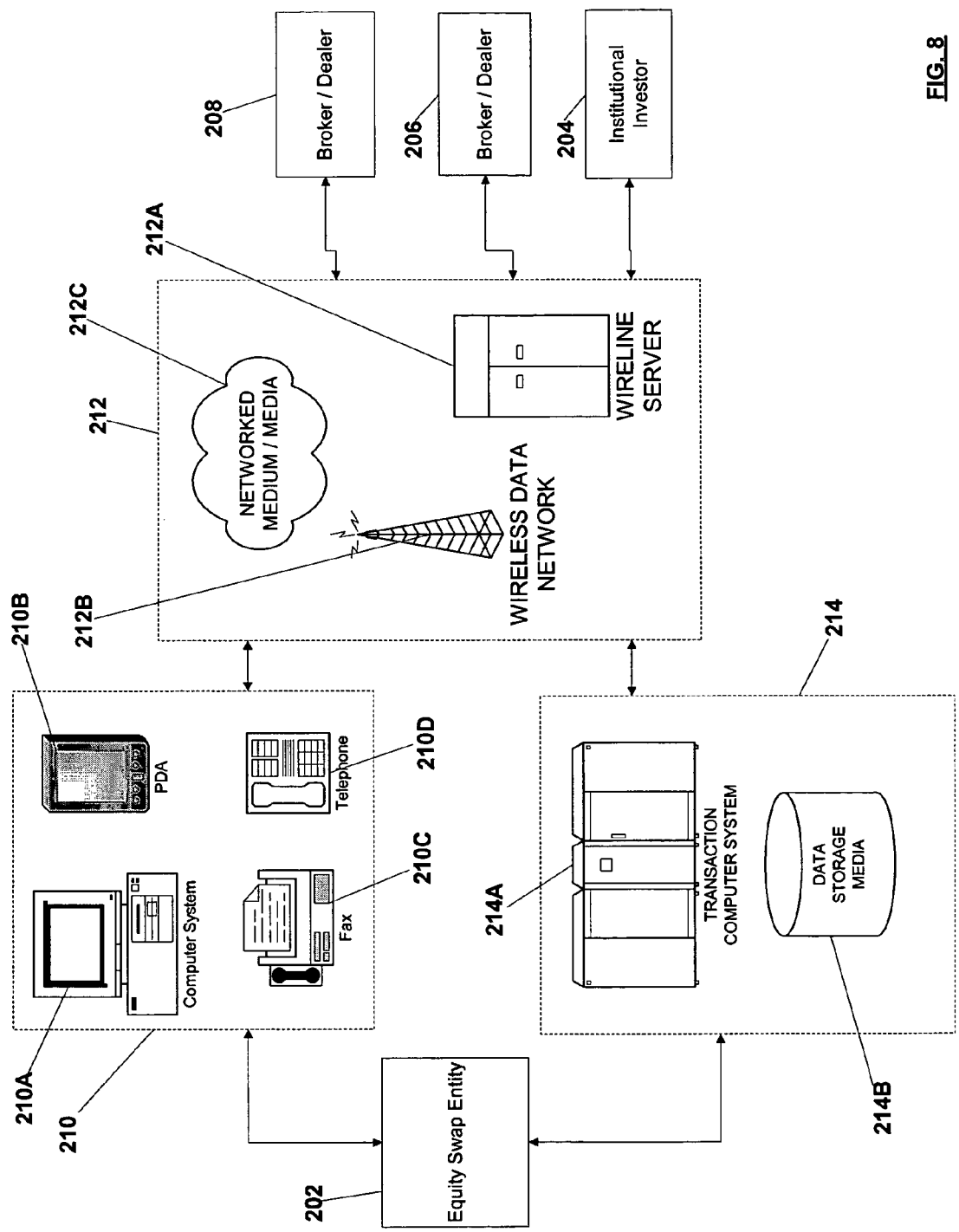
FIG. 8 includes a schematic system diagram illustrating various aspects of the present methods and systems; and, FIG. 9 includes a tabulation of experimental results for a simulation performed in association with various aspects of the present methods and systems.

Referring now to FIG. 8, one system embodiment is provided in accordance with the practice of the present methods and systems. As shown, the equity swap entity 202, for example, can communicate and/or exchange data with one or more of the institutional investor 204, the Broker/Dealer 206, and/or the Broker/Dealer 208. The equity swap entity 202, for example, can possess one or more communications devices 210 such as, for example and without limitation, a computer system 210A, a personal digital assistant 210B, a fax machine 210C, and/or a telephone 210D, and/or other like communication devices. The communication devices 210 permits the equity swap entity 202, the institutional investor 204, the Broker/Dealer 206, and/or the Broker/Dealer 208 to communicate between/among each other through one or more communication media 212. The communication media 212 can include, for example and without limitation, wireline communication means such as a wireline server 212A, a wireless data network 212B, and/or a connection through a networked medium or media 212C (e.g., the Internet).

In addition, the equity swap entity 202 (as well as any one or more of the institutional investor 204, the Broker/Dealer 206, and/or the Broker/Dealer 208) can be operatively associated with one or more data processing/storage devices 214. As illustrated in FIG. 8, the equity swap entity 202 can be operatively associated with a transaction computer system 214A, for example, and/or one or more data storage media 214B that process/store/retrieve data and other information derived from communications that occur between/among the equity swap entity 202, the institutional investor 204, the Broker/Dealer 206, and/or the Broker/Dealer 208.

Experimental Results

Referring now to FIG. 9, the results of a simulation performed in association with various aspects of various embodiments of the present investment methods and systems are presented in tabular format. The experimental simulation was performed on the basis of the following assumptions:

Experimental Assumptions:

| | |
|---|---|
| Initial Option Delta | 66.6% |
| % of Dividend DRD Eligible | 50% |
| Avg. Quarterly Dividend Yield | 2.5% |
| Costs of Strategy | 70 bp per annum |
| Notional of Strategy | $500 mm |
| Number of Investment Periods | 8 |
| Avg. Number of Pairs Outstanding | 20 |
| 45 Day Standard Deviation of 20 Pairs | 30 bp |
| Federal Funds Rate ("FFR") | 1.25% |
| Effective Tax Rate | 40% |
| Duration of Strategy | 1 Year |
| Return data follows a normal distribution. | |
| Tax losses from execution of the strategy are fully or substantially fully utilized. | |

It should be understood that no particular aspect or aspects of the simulation performed and/or the experimental results, as presented, are intended to limit the scope of the present methods and systems. As with the operational examples provided herein, the experimental results are provided for convenience of disclosure of various embodiments/aspects of the present methods and systems.

The benefits of the present methods and systems are readily apparent to those skilled in the art. The various embodiments described herein may provide enhanced returns on investment derived, in various aspects, from one or more volatility-based investment strategies. In other aspects of the present methods and systems, retention of a relatively high level of liquidity is provided while minimizing credit risks associated with various aspects of the present investment strategies.

The term "computer-readable medium" is defined herein as understood by those skilled in the art. It can be appreciated, for example, that method steps described herein may be performed, in certain embodiments, using instructions stored on a computer-readable medium or media that direct a computer system to perform the method steps. A computer-readable medium can include, for example, memory devices such as diskettes, compact discs of both read-only and writeable varieties, optical disk drives, and hard disk drives. A computer-readable medium can also include memory storage that can be physical, virtual, permanent, temporary, semi-permanent and/or semi-temporary. A computer-readable medium can further include one or more data signals transmitted on one or more carrier waves.

As used herein, a "computer" or "computer system" may be a wireless or wireline variety of a microcomputer, minicomputer, laptop, personal data assistant (PDA), cellular phone, pager, processor, or any other computerized device capable of configuration for transmitting and receiving data over a network. Computer devices disclosed herein can include memory for storing certain software applications used in obtaining, processing and communicating data. It can be appreciated that such memory can be internal or external. The memory can also include any means for storing software, including a hard disk, an optical disk, floppy disk, ROM (read only memory), RAM (random access memory), PROM (programmable ROM), EEPROM (extended erasable PROM), and other like computer-readable media.

It is to be understood that the figures and descriptions of the present invention have been simplified to illustrate elements that are relevant for a clear understanding of the present invention, while eliminating, for purposes of clarity, other elements. Those of ordinary skill in the art will recognize, however, that these and other elements may be desirable. However, because such elements are well known in the art, and because they do not facilitate a better understanding of the present invention, a discussion of such elements is not provided herein.

It can be appreciated that, in some embodiments of the present methods and systems disclosed herein, a single component can be replaced by multiple components, and multiple components replaced by a single component, to perform a given function or functions. Except where such substitution would not be operative to practice the present methods and systems, such substitution is within the scope of the present invention.

Examples presented herein are intended to illustrate potential implementations of the present method and system embodiments. It can be appreciated that such examples are intended primarily for purposes of illustration. No particular aspect or aspects of the example method and system embodiments described herein are intended to limit the scope of the present invention.

It should be appreciated that all the figures are presented for illustrative purposes and not as construction drawings. Omitted details and modifications or alternative embodiments are within the purview of persons of ordinary skill in the art. Furthermore, whereas particular embodiments of the invention have been described herein for the purpose of illustrating the invention and not for the purpose of limiting the same, it will be appreciated by those of ordinary skill in the art that numerous variations of the details, materials and arrangement of parts may be made within the principle and scope of the invention without departing from the invention as described in the appended claims.

What is claimed is:

1. A computer-assisted investment method for use by an institutional investor, said investment method comprising the steps of:

selling a call to a first broker/dealer, wherein the call is sold via one or more electronic communication devices that transmit electronic communications via an electronic data network, wherein the call is associated with a first group of securities of said investor, wherein one or more of said electronic communication devices comprise a processor and a memory;

entering into, via said one or more electronic communication devices, a short swap arrangement with an equity swap counterparty, said short swap arrangement being associated with said call and said first group of securities, wherein, pursuant to the short swap arrangement, said equity swap counterparty is to receive payments comprising any depreciation in said first group of securities and a finance payment, and is responsible for payments comprising any appreciation in said first group of securities and any dividends paid on said first group of securities;

entering into, via said one or more electronic communication devices, a capped swap arrangement with a second broker/dealer, wherein the capped swap arrangement is based on a second group of securities, wherein, pursuant to said capped swap arrangement, said institutional investor agrees to make payments to said second broker/dealer comprising a portion of a notional value of the second group of securities and appreciation of the second group of securities up to a predetermined cap value, and wherein the second broker/dealer agrees to make payments comprising depreciation on the said second group of securities;

setting, by a computer system, the predetermined cap value of said capped swap arrangement so that a delta of an embedded long call on said second group of securities equals a delta of said call on said first group of securities, wherein the deltas of said long call on said second group of securities and said first call on second first group of securities are calculated using said computer system based on changes in prices in the first and second securities, and wherein said computer system comprises a processor and memory and is connected to an electronic computer network; and, entering into, via said one or more electronic communication devices, a long swap arrangement with said equity swap counterparty, wherein the long swap arrangement is based on said second group of securities, wherein said long swap arrangement and said short swap arrangement are co-pending between said institutional investor and said equity swap counterparty, and wherein at least one of said investor and said equity swap counterparty rebalance respective notional values of said long swap arrangement on said second group of securities and said short swap arrangement on said first group of securities.

2. The investment method of claim 1, further comprising basing said short swap arrangement on a net delta between said call and said first group of securities.

3. The investment method of claim 1, further comprising basing said long swap arrangement on a delta of said capped swap arrangement based on said second group of securities.

4. The investment method of claim 1, wherein at least one of said broker/dealers is based outside of the United States.

5. The investment method of claim 1, wherein at least one of said broker/dealers is based in the United States.

6. The method of claim 1, further comprising negotiating a termination of at least one of said call, said capped swap arrangement, said long swap arrangement, and said short swap arrangement.

7. The method of claim 6, further comprising selling said first group of securities.

8. The method of claim 1, wherein said first broker/dealer is said equity swap counterparty.

9. The method of claim 1, wherein the first group of securities comprise stock.

10. The method of claim 1, wherein:
the first broker/dealer is located in the United States; and
the second broker/dealer is located outside of the United States.

11. The method of claim 1, wherein the institutional investor comprises a United States corporation.

12. The method of claim 1, wherein an initial notional value of the second group of securities approximately equals a value of the first group of securities at a time when the capped swap arrangement is entered into.

13. The method of claim 1, further comprising the institutional investor adjusting notional values of the long swap arrangement and the capped swap arrangement after entering into the long swap arrangement and the capped swap arrangement.

14. The method of claim 1, wherein pursuant to the capped swap agreement the equity swap counterparty additionally agrees to pay the institutional investor interest payments.

15. The method of claim 14, wherein an interest rate of the interest payments is Libor-based.

* * * * *